(No Model.)
E. BROWN.
Vise and Shears Combined.
No. 230,400. Patented July 27, 1880.
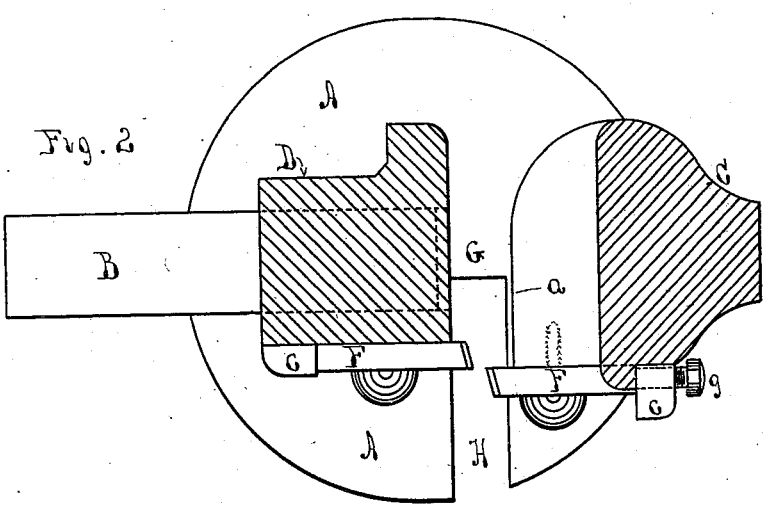
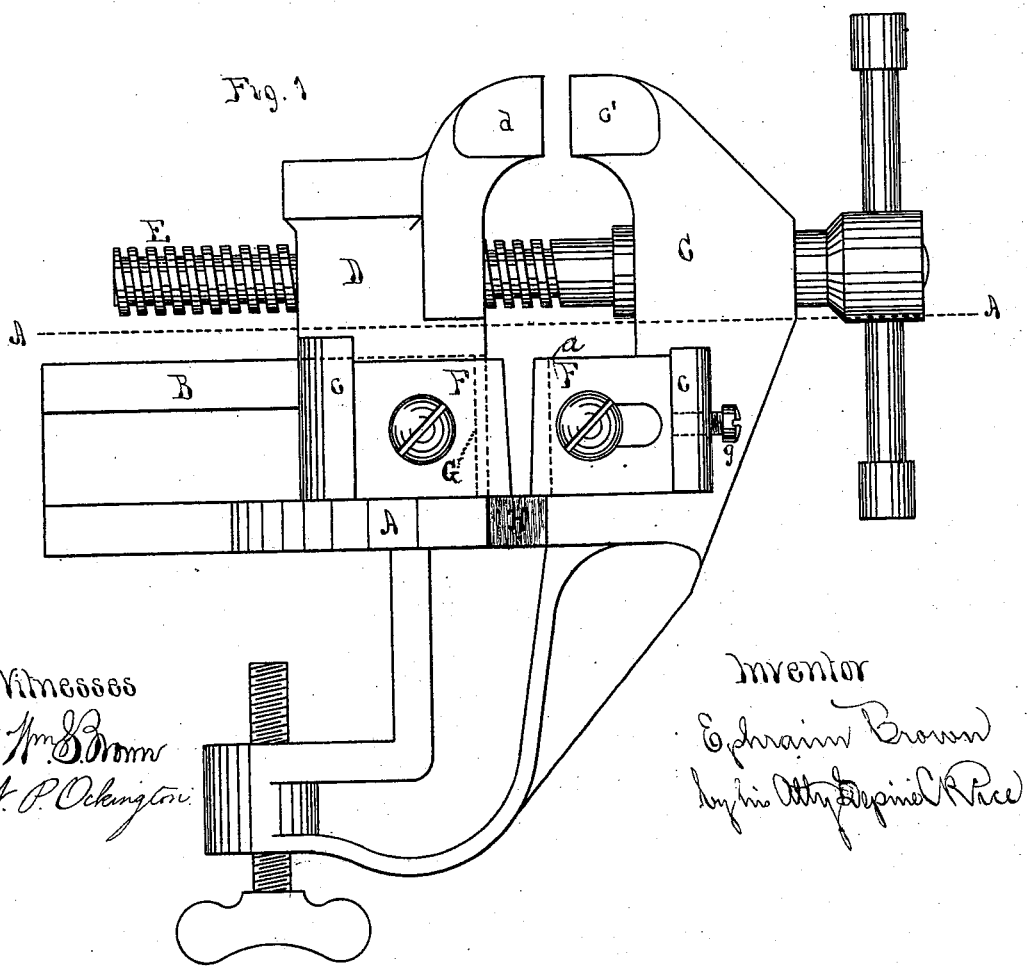
Witnesses  
Wm. S. Brown  
N. P. Ockington
Inventor  
Ephraim Brown  
by his Atty Dupinel C. Rice

UNITED STATES PATENT OFFICE.

EPHRAIM BROWN, OF LOWELL, MASSACHUSETTS.

VISE AND SHEARS COMBINED.

SPECIFICATION forming part of Letters Patent No. 230,400, dated July 27, 1880.

Application filed April 24, 1880. (No model.)

*To all whom it may concern:*

Be it known that I, EPHRAIM BROWN, of the city of Lowell, county of Middlesex, and State of Massachusetts, have invented a new and useful Vise and Shears combined, of which the following is a specification.

My invention relates to improvements in combination-tools used for holding or cutting metal; and the object of my invention is to combine a shear with a vise, so that either will be available for its appropriate use without in any way disarranging or adjusting the other.

In the drawings, in which similar letters of reference indicate like parts, Figure 1 is a side elevation of my combined vise and shears. Fig. 2 is a plan view, showing the jaws C and D in section on line A A of Fig. 1.

A is a bed-plate of a vise of ordinary construction. Attached to this plate is a rib or way, B, and fixed jaw C. Sliding on the rib is the jaw D. These jaws are moved toward each other by a screw, E. Attached to the jaws C and D are the shear-plates F, whose edges come in contact or pass by each other before the jaws C and D touch each other, in order that any object which may be placed between them may be divided before the action of the vise is stopped by the grasping-faces $c'$ $d$ of the jaws coming in contact.

In the bed-plate A, I provide a slot, H, so that the edge of a sheet of metal may be placed between the shear-plates and acted upon.

The bar or rib B, usually continued along the bed-plate A and united with the jaw C, has a slot, G, cut through it, so that rods or long pieces can be thrust through between the jaws below the screw and dropped down between the shears and cut at any length desired. This slot may or may not extend the entire depth of the bar B, and is seen in Fig. 2 between the dotted line indicating the end of the bar and the shoulder $a$, against which the shear-plate of the fixed jaw is placed.

On the jaws are formed lugs $c$, against which the shear-plates abut. Through one of them I put a set-screw, $g$, by means of which the shear-plate can be adjusted when it becomes shorter from grinding. The shear-plates are attached to the jaws by screws, and the holes through which they pass may be slotted to permit of ready adjustment.

It will be observed that in the construction of this combination-tool I have in no way impaired its usefulness as a vise, as the attached shear is placed below the level of the screw operating the vise, and the space under the screw, which served no desirable purpose, is now made useful to pass the objects to be operated upon through.

What I claim as new and of my invention is—

1. The combination of the jaw D and jaw C with the bar B and bed-plate A, provided with the slot H, substantially as described.

2. The combination of the jaws C and D, provided with the shear-plates F, with the bar B, provided with the slot G, substantially as described.

3. The combination of the jaws C and D, provided with the shear-plates F, with the bar B and bed-plate A, substantially as described.

EPHRAIM BROWN.

Witnesses:
LEPINE C. RICE,
ELIZABETH G. RICE.